Figures 1, 2, 3:
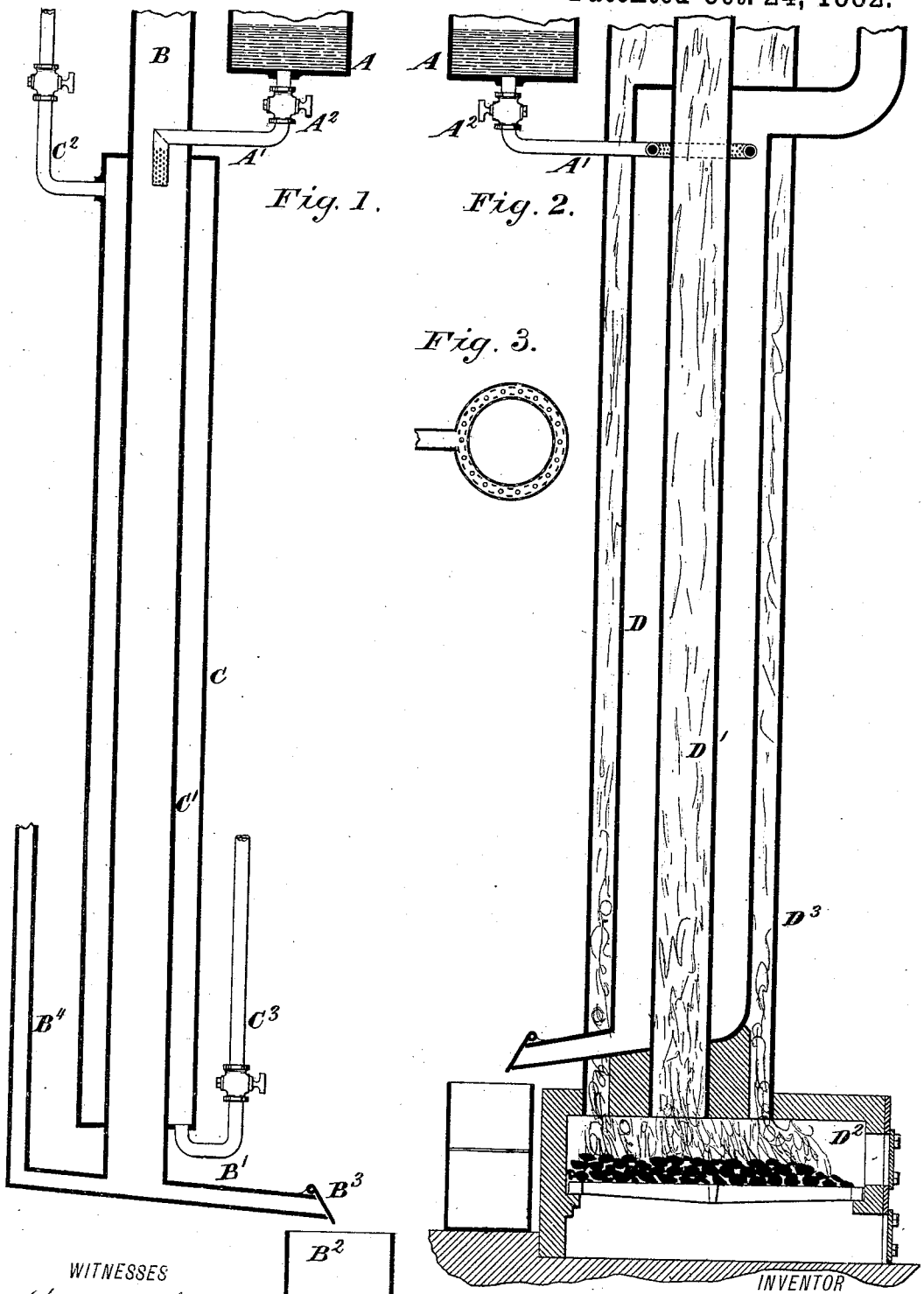

(No Model.)

J. A. MORRELL.
APPARATUS FOR THE MANUFACTURE OF SUGAR.

No. 266,300. Patented Oct. 24, 1882.

WITNESSES
Wm A. Skinkle
Wm J. Tanner

INVENTOR
James A. Morrell.
By his Attorneys.
Holloway & Blanchard.

UNITED STATES PATENT OFFICE.

JAMES A. MORRELL, OF NEW YORK, N. Y., ASSIGNOR TO THE JAMES A. MORRELL EVAPORATOR COMPANY, OF SAME PLACE.

APPARATUS FOR THE MANUFACTURE OF SUGAR.

SPECIFICATION forming part of Letters Patent No. 266,300, dated October 24, 1882.

Application filed February 21, 1882. (No model.)

*To all whom it may concern:*

Be it known that I, JAMES A. MORRELL, a citizen of the United States, residing at New York, in the county of New York and State of New York, have invented certain new and useful Improvements in Apparatus for the Manufacture of Sugar, of which the following is a a specification, reference being had therein to the accompanying drawings.

My invention relates to an apparatus for making sugar from saccharine liquids, which may also be used for condensing milk, making salt, and for other similar purposes; and the object of my improvement is to provide an apparatus for evaporating cane-juice and other saccharine substances, consisting of a vertical pipe or vessel heated externally or internally, or both externally and internally, by steam or heated air, and a perforated pipe or vessel through which the material is passed for the purpose of converting it into a spray, or converting it into small drops, before it passes through the heated pipe or vessel. I attain these objects by the apparatus shown in the accompanying drawings, in which—

Figure 1 is a sectional elevation, showing a tank for containing the material to be treated, a pipe leading therefrom controlled by a valve and terminating in a rose-head or perforated portion within a heating tube or vessel, a surrounding vessel for containing steam or heated air, steam induction and eduction pipes, a pipe for drawing off the sugar or other substance, and a valve for excluding the air from the evaporating pipe or vessel. Fig. 2 is a sectional elevation of a slightly-modified form of apparatus for the same purposes, showing a furnace for heating air having extending from it two vertical passages through which the air passes, one surrounding the evaporating pipe or vessel and the other passing through it, showing also an outlet for the smoke and heated air and gases from the furnace, a tank for containing the substance to be treated, a pipe and valve, a spraying ring or pipe, a pipe for drawing off the sugar, and a valve for preventing the air from entering the evaporating-pipe; and Fig. 3 is a plan view of the spraying pipe or ring.

Similar letters refer to similar parts throughout the several views.

Efforts have heretofore been made to convert cane-juice and other saccharine substances into sugar by passing them through exteriorly-heated pipes, which pipes have been heated in some cases by superheated steam and in others by the heated air and gases proceeding from a furnace; but all of these with which I am acquainted have proved to be objectionable, for the reason that the pipes or vessels through which the material has been passed have been so constructed that the juice or other substance in passing has rested for a greater or less period of time upon the surface or surfaces of the heated pipe or vessel, and hence have been liable to be and have been burned more or less, as a consequence of which the quality of the sugar or other resultant has been poor.

My improved method of evaporation is designed to and does remove these objections, as in carrying it out the material is introduced either by its own gravity or by means of a pump or other forcing mechanism, and in a continuous stream or intermittingly, into a vertical pipe or vessel of the required length and diameter in the form of spray or in finely-comminuted drops or particles, through which it falls without coming in contact with the wall of the pipe, or, at least, without remaining in contact therewith sufficiently long to be injuriously affected thereby. This pipe is to be sufficiently long to 'cause the heat passing through its walls to convert what water there is in the material into steam, which passes out through the upper end of the evaporating-pipe, while the sugar or other substance treated passes off by its own gravity through a pipe attached to the lower end of the evaporating-vessel.

In constructing apparatus I provide a tank, A, for containing the material to be treated, to the under side of which there is attached a pipe, A', which is provided a valve, A'', for regulating the flow of the juice to the evaporating vessel or pipe, within which the pipe A' terminates, that portion of it which is within said evaporating-pipe being perforated with a series of very small holes for the purpose of comminuting the material as it passes out of it, and causing it to fall through said evaporating-vessel in very small drops or in the form of spray. I have contemplated the use of a pump or other form of forcing mechanism for feeding the material to the evaporating-pipe, either in a continuous stream or intermittently, as may be found most desirable.

The evaporating-vessel above alluded to, which I prefer to use when steam is used as the agent for heating it, is shown at B in Fig. 1, it consisting of a long pipe, the diameter and length of which are to be such as may be found best in practice, the requirement being that it shall be of such length as to cause the heat passing through it to convert all of the water contained in the substance treated into steam before it reaches the lower end thereof. I have found in practice that a pipe of from six to twelve feet in length and from three to six inches in diameter gives good results when evaporating saccharine substances; but these dimensions may be varied according to circumstances, as much will depend upon the degree of heat contained in the steam.

To the lower end of the pipe or vessel B, which may be round, square, or of any other form in its cross-section, there is attached a pipe, B', into which the sugar or other solid parts of the material treated fall, and by which they are conducted into a suitable tank, B'', the outer end of said pipe being provided with a valve, B''', for the purpose of excluding air from the pipe when the apparatus is in operation.

For the purpose of aiding in carrying off any vapor that may arise from the substance while it remains in the pipe B', there may be attached to its rear end an upwardly-extending pipe, B'''', which may be carried to any desired height and its upper end left open.

For the purpose of applying the heat advantageously to the pipe B, it is surrounded by a cylinder, C, the length of which is nearly equal to that of said pipe, its diameter being such as to leave between it and the pipe a space, C', for the reception of steam, which may be superheated or not, as found desirable in particular cases. The steam is admitted through a pipe, C'', at or near the upper end of space C', a valve or cock being placed in said pipe for regulating the amount of steam admitted, such steam and the water of condensation being allowed to pass off through a pipe, C''', and a valve attached to the lowest part of the cylinder C.

The modification of the apparatus shown in Fig. 2 is designed to show how it may be constructed when it is desirable to use heated air instead of steam, the difference consisting in providing a larger pipe in which the evaporation is caused, as shown at D, and passing through it a flue, D', the lower end of which communicates directly with the furnace, and in providing an annular flue, D''', which also communicates with the furnace and surrounds the evaporating pipe or vessel D. The method of introducing the material to be treated into the evaporating pipe or vessel and discharging the resultant product therefrom is the same as that described, the only difference being that the form of the perforated portion of the injection-pipe is changed for the purpose of adapting it for the passage through it of the flue D.

Having thus described my invention, what I claim, and desire to secure by Letters Patent, is—

The herein-described apparatus for evaporating saccharine and other substances, it consisting of the combination of the following-named elements: a vertical pipe or vessel heated by steam or hot air, a cylinder surrounding said pipe or vessel, a perforated pipe or equivalent device for spraying or comminuting the material as it passes into the evaporating pipe or vessel, a pipe for drawing off the resultant product, and a valve for preventing the ingress of air to the evaporating pipe or vessel, all substantially as and for the purpose set forth.

In testimony whereof I affix my signature in presence of two witnesses.

JAMES A. MORRELL.

Witnesses:
H. B. MORRELL,
H. W. VAN COOK.